United States Patent
Sheetz

[15] 3,643,799
[45] Feb. 22, 1972

[54] APPARATUS FOR SIZING FRUIT

[72] Inventor: Charles E. Sheetz, Woodstock, Va.
[73] Assignee: FMC Corporation, San Jose, Calif.
[22] Filed: Sept. 30, 1970
[21] Appl. No.: 76,955

[52] U.S. Cl. ..............................................209/73, 209/84
[51] Int. Cl. ..........................................................B07c 5/04
[58] Field of Search ......................................209/84, 73, 74

[56] References Cited

UNITED STATES PATENTS

| | | | |
|---|---|---|---|
| 2,406,842 | 9/1946 | Lupton | 209/84 |
| 3,337,049 | 8/1967 | Carlsen | 209/84 |

Primary Examiner—Allen N. Knowles
Assistant Examiner—Gene A. Church
Attorney—F. W. Anderson, C. E. Tripp and R. S. Kelly

[57] ABSTRACT

A fruit-sizing system comprising a horizontally positioned, generally U-shaped water-filled conveyor tank having a recirculation pumping system connecting the ends of the tank to cause the water therein to continuously flow longitudinally through the tank. Fruit of different sizes is deposited in the water at the end of one of the legs of the tank and is conveyed through the tank by the movement of the water therein. At each corner of the tank and at the end of the other of the legs there is provided an endless sizing conveyor which removes certain of the fruit from the tank while permitting the remainder to flow therethrough and continue in their flow path through the tank.

6 Claims, 3 Drawing Figures

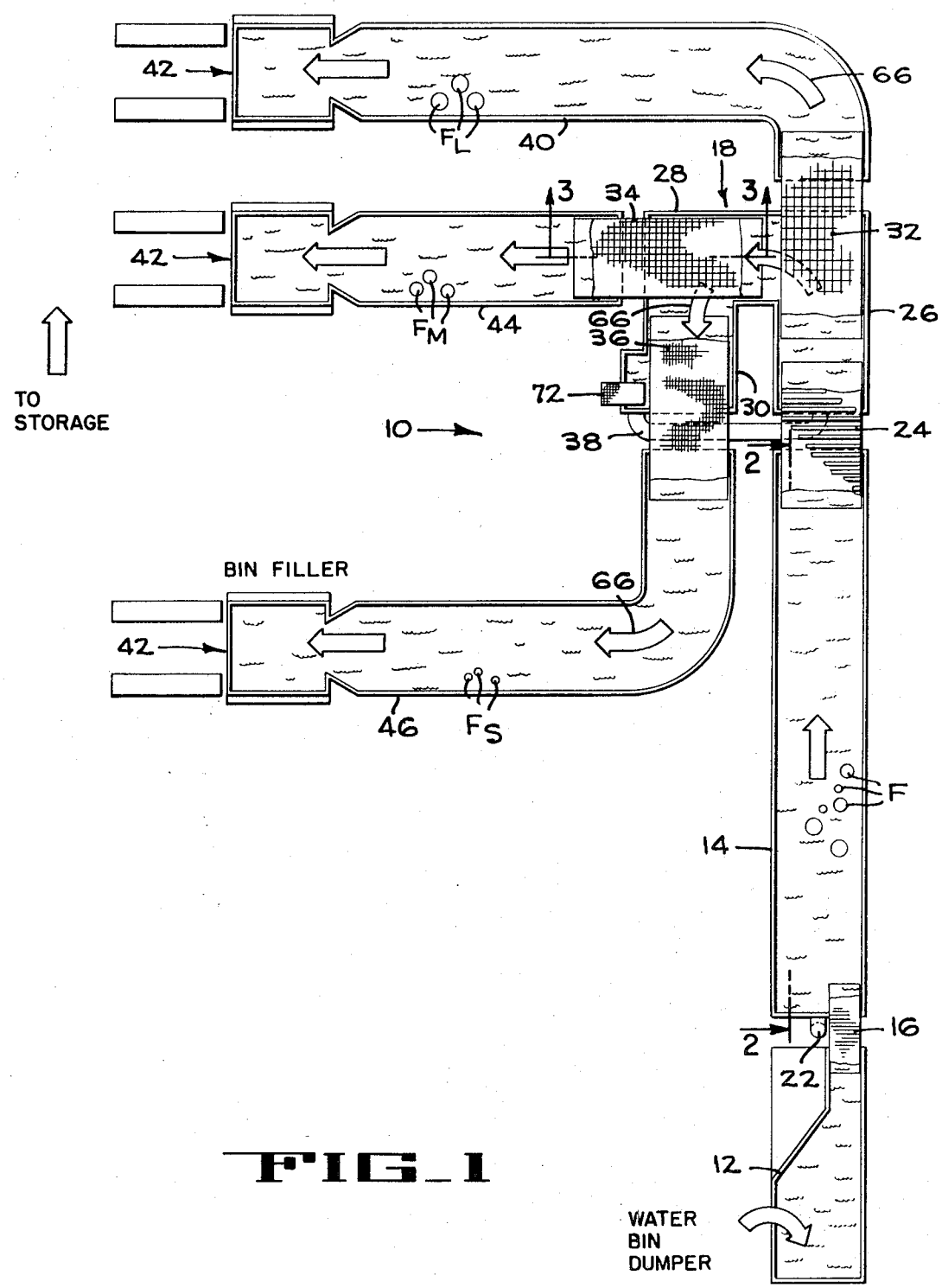
FIG_1

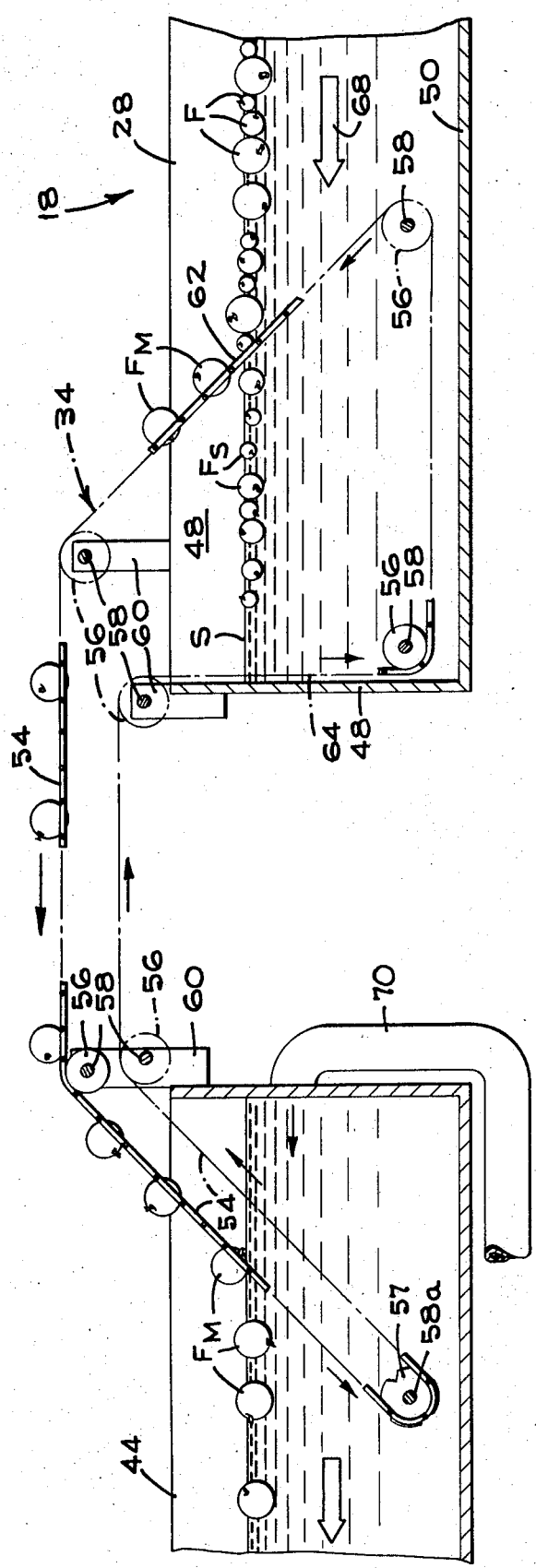
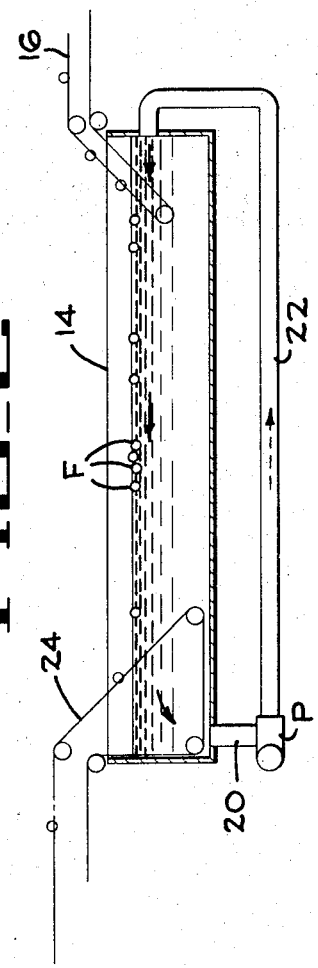

APPARATUS FOR SIZING FRUIT

BACKGROUND OF THE INVENTION

1. Field of the Invention

The present invention concerns sizing of fragile fruit and in particular relates to a method and apparatus wherein the fruit is carried in a stream of fluid and the desired size of fruit is removed therefrom.

2. Description of the Prior Art

Prior art sorting and sizing systems for fruit such as apples generally utilized purely mechanical conveying and sizing devices. McSherry Lupton, in U.S. Pat. No. 2,406,842, describes such a fruit sorting system in which the fruit is passed over a plurality of sizing screen conveyors having progressively smaller screen openings. The entire mass of fruit is deposited on a screen conveyor which retains the largest sized fruit and allows the remainder to drop through onto a belt conveyor leading to the next sizing screen conveyor. It can readily be seen that such sizing systems did not provide particularly gentle handling of the fruit, and oftentimes a considerable amount of bruising or other damage occurred to the fruit which decreased its value.

In recent years hydrosizing systems have been developed which utilize a water medium to handle the fruit during the sizing operations so as to minimize the damage done by the conventional mechanical sizing systems. In U.S. Pat. No. 3,337,049, Carlsen describes such a hydrosizing apparatus in which the fruit to be sized is carried in a stream of liquid in a compartmented tank. A sizing conveyor having an upwardly bowed portion lifts the largest sized fruit from the stream and redeposits it further downstream. The medium and small fruit not picked up is obliquely diverted from under the bowed section, by means of a baffle and water jets, into a different compartment where the medium and small sized fruit are separated by an identical operation. While the use of a water-conveying medium has greatly reduced the damage to the fruit occasioned by the sizing process, the presently available water sizing systems, including the aforedescribed Carlsen system, require special fruit-diverting means such as jets or baffles which has increased their cost and which are not always completely effective in achieving a rapid and accurate separation of the fruit.

SUMMARY OF THE INVENTION

In the sizing method of the present invention a water conveyor is used to convey a plurality of differently sized fruit through a plurality of turns. At each turn, an endless sizing conveyor is provided which has an upper run to lift the largest of the fruit out of the water and deliver them to a body of water entirely separate from the water conveyor. The remaining fruit flow through the upper run of the sizing conveyor but are diverted before they reach the lower run of the conveyor by the natural circulating movement of the water medium that comprises the conveyor. The foregoing process is repeated at each turn of the water conveyor with progressively smaller sizes of fruit being removed from the water-conveying medium.

With the disclosed system wherein three sizes of fruit are to be separated, a generally U-shaped water conveyor can be used with a pumping system providing a continuous flow between the legs thereof. An endless conveyor is arranged at each of the conveyor turns and at the end of one of the legs with one run of the conveyor being angled upwardly out of the water to remove the largest of the fruit and with the other run thereof extending directly adjacent to the wall of the conveyor tank so as not to interfere with the natural movement of the fruit with the water medium.

A significant advantage of the present invention is that the fruit to be separated will flow naturally in a single continuous channel while the different sizes of fruit are removed therefrom without the aid of any special diverting jets or guide walls, etc., which may create undesirable accumulations of fruit or cause some bruising or other damage to the skin of the fruit.

The apparatus of the present invention comprises only the essential water conveyor tanks with the associate pumping and conduit systems and the conventional endless sizing conveyors. Consequently it can be obtained at a minimum cost to the user.

BRIEF DESCRIPTION OF THE DRAWINGS

FIG. 1 is a diagrammatic plan view of the sizing apparatus of the present invention.

FIG. 2 is an enlarged diagrammatic longitudinal section through one of the flumes shown in FIG. 1 and is taken on line 2—2 of FIG. 1.

FIG. 3 is an enlarged diagrammatic fragmentary section taken on line 3—3 of FIG. 1 through one leg of the separating tank and the associated discharge flume.

DESCRIPTION OF THE PREFERRED EMBODIMENT

The fruit-sizing system of the present invention is generally indicated at 10 (FIG. 1) and comprises a feeding device 12, such as a conventional water bin dumper of the submersion type for emptying bins of fruit into a water bath. From the feeder, fruit of varying sizes, generally indicated F, is gently transferred to a supply flume 14 by means of an endless transfer conveyor 16 comprised of a plurality of spaced rollers between which the fruit is received. The flume 14 delivers the fruit by means of a stream of moving liquid therein to a separating tank 18 in which the fruit (in the present illustration) is separated into three sizes.

The manner in which the moving stream of fluid is produced in the flume 14 is shown in FIG. 2. At the terminal end of the flume an outlet pipe 20 supplies the fluid to a pump P which returns the fluid to the forward portion of the flume via line 22 in a sufficient quantity and velocity to create a current in the flume to gently convey the floating fruit F therethrough.

At the end of the supply flume 14, a transfer conveyor 24, having either the well-known screen or bar (as shown) conveying surface, is employed to transfer the fruit F to the separating tank 18.

The separating tank generally indicated at 18 includes three communicating legs 26, 28, and 30 arranged in a U-shaped configuration as seen in FIG. 1. The U-shaped configuration is preferred since it provides for the most economical utilization of floor space. Each of the legs 26, 28 and 30 have a sizing conveyor 32, 34, and 36, respectively, positioned therein and extending across the entire width of the leg to prevent escape of fruit around the sizing conveyors.

Also seen in FIG. 1 is a recirculation line 38 that returns liquid from the terminal portion of leg 30 to the forward portion of leg 26 of the separation tank. An outlet line and recirculation pump are also employed but are not shown since they are identical with the recirculation system shown for the supply flume 14 shown in FIG. 2.

Each of the sizing conveyors 32, 34, and 36 are of the same construction and differ only as to the screen size, or spacing between the conveying elements. The first conveyor 32 has the largest openings and is effective only to separate or remove the largest sized fruit from the initial leg 26 of the separator tank 18. This conveyor then deposits the large fruit $F_L$ in a discharge flume 40 which leads to one of the three bin-filling apparatus generally indicated at 42. Likewise, the sizing conveyors 34 having smaller openings removes medium sized fruits $F_M$ and deposits them in a similar discharge flume 44 leading to another bin filler 42. The smallest sized fruit $F_S$ is removed by the sizing conveyor 36. This conveyor also discharges into a discharge flume 46 that leads to another bin filler 42. It is to be understood that each of the discharge flumes 40, 44 and 46 have liquid recirculation systems which operate in conjunction with the associated bin fillers.

The bin filler 42, which is effective to gently remove the fruits from the conveying liquid and place them in suitable storage bins, and the associated discharge flume are fully described in my copending United States patent application, Serial No. 76,867 filed Sept. 30, 1970, Attorney's Docket No. SJ 5383.

The manner in which separation or grading of the fruit is accomplished is best seen in FIG. 3. The central leg 28 of the separator tank 18 has continuous sidewalls 48 and a bottom 50 that are integral with the other legs 26 and 30. Mounted within the central leg 28 is the endless sizing conveyor 34 that comprises an open mesh conveying and sizing screen 54. Such a screen may be formed of a metallic mesh having square or polygonal openings of the desired size, such as shown in U.S. Pat. No. 3,337,049 (Supra). Alternately, the conveying surface may be formed of rods interlinked with flexible wire.

The conveyor screen 54 is supported within the tank on multiple rollers 56 and a grooved drive roller 57 which engages and projects into the openings of the conveyor screen as shown in the aforementioned patent to Carlsen. The rollers 56 are secured to shafts 58 that are rotatably mounted on the sidewalls 48 and frame members 60 extending thereabove. The conveyor is driven through a shaft 58a by means of an electric motor and speed reducer (not shown).

The conveying sizing run of the conveyor 34 has an upwardly inclined portion indicated at 62 that originates a sufficient distance below the surface of the water S and extends above the sidewalls 48 of the tank. The conveying run 62 extends horizontally over to the discharge flume 44 and then descends a sufficient distance below the surface of the water in the discharge flume. As the lower return run of the conveyor screen 54 enters the central leg 28 of the separating tank it closely parallels the sidewall 48 as indicated at 64. This is necessary in order to prevent the small sized fruit $F_s$, which pass through and are not picked up by the sloping portion of the conveying run 62, from having to pass through the sizing conveyor twice. The construction of the sizing conveyors 32 and 36 is similar to that described for conveyor 34, the only difference being the size of the openings in the conveyor screen 54.

One of the advantages of the present sizing apparatus is the employment of a single continuous liquid flow for the three sizing operations. The moving current created by recirculation smoothly flows around the U-shaped separating tank 18 as indicated by arrows 66 in FIG. 1 and no water jets or special baffles are required to redirect the fruit carried by the current.

Referring again to FIG. 3, the horizontal velocity of the conveyor 34 is preferably the same as the velocity of the fruit F carried by the fluid current indicated by arrow 68. This ensures sufficient velocity to cause the smaller fruit to pass through the conveyor 34 while minimizing the possibility of damaging the fruit by cutting or bruising.

In order to prevent bumping and bruising of the fruits as they are deposited into the discharge flume 44, the velocity of the liquid in the discharge flume from recirculation line 70 is preferably somewhat higher than the horizontal component of the velocity of conveyor 34 where it enters the discharge flume. This ensures that the fruits carried in the conveyor openings are gently urged outwardly or downstream with a minimum of bumping or bruising.

At the terminal end of leg 30 of the separator tank, there is a trash removal screen 72 which may be in the form of an endless screen conveyor that collects any remaining trash and fruit smaller than the openings in the sizing conveyor 36 and removes it from the separating tank 18. The inlet to the recirculation line 38 will be located directly below the trash removal screen so that the water in the separating tank will be moved to the screen.

Although the best mode contemplated for carrying out the present invention has been herein shown and described, it will be apparent that modification and variation may be made without departing from what is regarded to be the subject matter of the invention.

What is claimed is:

1. A method of sizing fruit or the like comprising the steps of floating a large number of fruit in a first moving stream of water, directing the stream and fruit to a continuously moving inclined sizing member having a fruit lifting run and a return run, lifting the largest sized fruit from the stream while permitting the remainder of flow through said lifting run, depositing said largest fruit in a second stream of water, deflecting said first stream before said stream reaches said return run, then directing the stream and remaining fruit to a second continuously moving inclined sizing member, lifting the next largest sized fruit from the stream while permitting the remainder to flow through said lifting run, and depositing the next largest fruit in a third stream of water.

2. A fruit-sizing system comprising a water-filled conveyor tank having spaced walls defining a water flow path for a plurality of fruit of different sizes, means for causing the water in said tank to flow in the direction of said flow path, said flow path having a plurality of changes in direction defined by corners in said conveyor tank, an endless sizing conveyor positioned at each of said corners with one end thereof being received in said tank beneath the water level, each of said conveyors having an upper run and a return run with the upper run being positioned so as to lift certain of the fruit from the tank while the remainder flow therethrough, means for maintaining a separate body of water at a position adjacent to each of said corners, said upper run of each of the conveyors being directed into the associated means for maintaining a separate body of water to deposit the lifted fruit therein, said tank causing the flow path of the water therein to divert said remainder of the fruit before they reach said return run of the conveyors.

3. A fruit-sizing system according to claim 2 including means for causing said separate bodies of water to flow in the direction of movement of the associated upper runs of the conveyors.

4. A fruit-sizing system according to claim 3 wherein said flow rate of said separate bodies of water is greater than the horizontal component of motion of the associated upper runs of the conveyors.

5. A fruit-sizing system according to claim 2 wherein said flow path is arranged to make a right angle turn at each of said corners, said one end of each of said sizing conveyors being located so that the upper run thereof is positioned so as to directly receive the fruit moving in a first direction and the return run thereof is positioned parallel to and directly adjacent to a wall of the conveyor tank whereby the fruit not lifted by said upper run will flow through said upper run in said first direction and then be caused to move in a second direction at right angles to said first direction and parallel to said return run of the conveyor.

6. A fruit-sizing system comprising a water-filled fruit conveyor tank having a pair of opposed walls defining a flow path therebetween, said walls being arranged so that said flow path is U-shaped in a horizontal plane, means for causing the water in the tank to continuously flow in the direction of the flow path, means for depositing a plurality of fruit at the end of one of the legs of the flow path, a first endless sizing conveyor having one end thereof immersed in said tank at one of the corners of the flow path for removing the largest of said fruit, a second endless sizing conveyor having one end thereof immersed in said tank at the other corner of the flow path for removing the next largest of said fruit, conveyor means at the end of the other leg of the flow path for removing the smallest of said fruit, and separate bodies of water provided adjacent to each corner of the tank and at the end of said other leg of the flow path for receiving the fruit removed by said sizing conveyors and by the conveyor means for removing the smallest fruit.

* * * * *